Patented May 8, 1951

2,551,768

UNITED STATES PATENT OFFICE 2,551,768

ROTARY DRILLING FLUIDS

John E. Sherborne, Whittier, Calif., assignor to Union Oil Company of California, Los Angeles, Calif., a corporation of California No Drawing. Application October 24, 1947, Serial No. 782,023

3 Claims. (Cl. 252—8.5)

This invention relates to fluids employed in the drilling of oil, gas and other wells and to methods for drilling wells employing such fluids. The invention more particularly relates to fluids known as drilling muds which are employed in the drilling of oil wells with rotary drilling tools, and which drilling muds contain added agents to impart desirable physical characteristics and to simultaneously treat the producing formation to provide an increased initial petroleum production rate.

In drilling an oil, gas or water well by means of rotary drilling tools, hollow drill pipe or drill stem with a rotary bit attached to the lower end is used. The drill pipe and bit are rotated to drill out the borehole. A fluid commonly termed a drilling mud is circulated downwardly through the hollow drill stem and bit to the bottom of the borehole and then upwardly to the surface through the annular space between the drill stem and the face of the borehole. The drilling mud in general comprises a suspension of solid material in a liquid medium such as water and may contain other added agents. The drilling mud serves to lubricate and cool the drill bit, suspend and carry cuttings out of the borehole, plaster the face of the borehole with a thin impervious layer of solid material to prevent flow of fluids into or out of the formation, apply a hydrostatic pressure to the formation to counterbalance the pressure of liquids or gases sometimes present there, and fulfill other requirements.

In order for the drilling fluid to perform the above functions it must have certain desirable physical properties. The fluid must have a viscosity of such a magnitude that it is conveniently pumpable without undue pressure differentials. It must be sufficiently thixotropic so that cuttings will remain suspended in the borehole should circulation of the mud be stopped for any reason, and in addition readily release the cuttings from suspension when the fluid is agitated as in the settling pits. It must further form a thin impervious filter cake on the borehole face to prevent the loss of the liquid medium present in the drilling mud by filtration into the formations through which the borehole passes. Such a filter cake effectively seals the face of the borehole and inhibits any tendencies toward sloughing, heaving or cave-in of rock into the borehole. The fluid must be further capable of suspending weighting agents such as inorganic compounds having high specific gravities, such as compounds of the heavy metals, so that a pressure substantially greater than the hydrostatic pressure of a column of water of equal depth may be applied when necessary to the formation. The fluid should also be of such a constitution that the presence of granular material, such as cuttings formed in drilling the borehole and which may be assimilated or dissolved by the drilling mud has substantially no effect on the physical properties of the drilling fluid.

One physical characteristic of a drilling mud which is of considerable importance is its ability to form a thin impervious cake on the walls or the face of the borehole to seal this surface against fluid flow therethrough. This property may also be termed the cake-forming, water loss, sealing, or filtration characteristic. A measure of the ability of a drilling mud to form such a thick impervious layer may be obtained by means of a simple filtration test in which the mud cake is formed and pressed against the membrane or filter which is permeable to water. A standardized procedure for determining the filtration rate is described in "Recommended Practice on Field Procedure for Testing Drilling Fluids, A. P. I. Code No. 29, Second Edition," published July 1942, beginning on page 11. The test briefly comprises measuring the total volume of filtrate water obtained during a given time interval of pressure filtration. The best procedure for determining the filtration rate is to measure the filtrate volume obtained during the first hour of the test, however, the volume of filtrate obtained during the first five minutes or the first fifteen minutes of filtration may be employed as an indication of the filtration rate. Numerous correlations of such filtration rate determinations with actual drilling experience with the same drilling muds have indicated that fluid yielding a total filtrate in excess of about 45 ml. during the first hour may be dangerous to use and that drilling muds yielding less than about 30 ml. during the first hour under the same testing conditions are generally very satisfactory.

Another important characteristic of drilling muds is their viscosity which should be of such a magnitude that the fluid may be readily and easily circulated by pumping such as is ordinarily employed during drilling operations. A standardized procedure is generally used in which a Marsh funnel viscosimeter is employed. The time required for a given volume of drilling mud to pass through the funnel is determined and taken as an indication of the viscosity or pumpability. This test may be conducted by measuring 1500 ml. of drilling fluid into the funnel and measuring the time required for 1000 ml. to run out, the viscosity being given in terms of time in seconds. The standardized procedure for the determination of the Marsh viscosity, apparent viscosity, or funnel viscosity, as they may be termed, may be found in "Recommended Practice on Standard Field Procedure for Testing Drilling Fluids, A. P. I. Code No. 29, Second Edition," published July 1942, page 6.

Oil-producing formations are believed to be porous layers containing sand and having varying degrees of permeability to the flow of fluids such as oil, water, or gas. Consequently, the rate of oil production from an oil well is largely determined by the rate of flow of oil through these permeable formations which in turn is dependent upon the porosity or permeability of the sand or stone present. In drilling through such a porous layer it has been considered necessary to employ a drilling mud having such characteristics that liquids or solids were prevented from penetrating the porous producing formation since undesirable effects were believed to result from such penetration. In employing water base drilling muds, the porous formation was assumed to become wet by water causing the production rate of the wells to be less than if the formation was preferentially wet by oil. Further, some porous oil-bearing formations contain argillaceous materials, such as in certain California oil fields, which are caused to swell when contacted by water thus filling the interstices of the porous formation and decreasing the permeability to oil flow. The use of drilling fluids containing substantial quantities of saline constituents, such as concentrated or even saturated salt solutions, have been previously used in an effort to inhibit the decrease in oil production rate caused by wetting the formation with water and decreasing the permeability of the porous rock through contact with water. Such drilling fluids offer severe disadvantages to the employment of electric logging since the presence of large quantities of electrolytes render the electric log obtained of substantially no value.

The present invention is, therefore, directed to the production of drilling fluids having such physical characteristics that they fulfill the requirements given above as well as having a beneficial effect upon the producing formation and permitting continuous electric logging of the borehole as it is being drilled to permit the completion of a producing well having the maximum possible recovery rate.

It is a primary object of this invention to provide a drilling mud with which it is possible to maintain a low viscosity, a firm thin impervious mud cake on the face of the borehole and low water loss or filtration rate characteristics at low drilling mud densities.

It is a further object of the present invention to provide a rotary drilling mud having an unusually low water loss rate as determined by standard test procedures and simultaneously maintaining other physical characteristics of the fluid at desired values.

It is another object of this invention to provide a drilling mud having a viscosity of between about 33 and 65 Marsh seconds and a low filtration rate.

It is a more particular object of the present invention to provide a drilling mud which comprises water, a water-soluble salt of a divalent metal, a protective colloid, and a suitable quantity of clay.

It is still a further object to provide a drilling mud capable of increasing the permeability of the producing formation while simultaneously drilling a borehole through said producing formation.

It is another object of this invention to provide a method of drilling wells which employs the drilling mud herein described and which aids in the completion of wells of comparably increased productivity.

Other objects and advantages of this invention will become apparent to those skilled in the art as the description thereof proceeds.

Briefly, the present invention comprises a water base drilling fluid containing suspended colloidal solids such as bentonite or other suitable clay, and to which fluid has been added a protective colloid and a water-soluble divalent metal salt. The divalent metal salt liberates in the drilling mud divalent metal ions which have been found to have a beneficial effect on porous formations such as oil sands. The protective colloid serves to regulate such physical properties as water loss rate and viscosity of the drilling mud. The drilling muds of this invention may further contain suitable weighting agents to increase the density of the fluid together with germicides, and the like, to inhibit deterioration of the colloid, if necessary. This invention further comprises a method of drilling wells using such drilling muds.

Many oil-bearing strata, and California oil sands in general are known to contain argillaceous materials within the porous formation. Such materials include bentonitic clays which exhibit marked changes in volume depending upon the composition of the connate water with which they are in contact. Considerable research has shown that under certain conditions many of the clays in the formation are predominantly sodium clays which increase in volume when the connate water is displaced by fresh water. Such a displacement occurs when a fresh water drilling mud is employed which has an appreciable filtration rate thus causing the clay in the permeable formation to swell and decreasing the permeability. It has further been found that the divalent ion clays are considerably smaller in volume than the sodium clays. This is believed to be the basic reason for the noted increase in permeability of such formations and the increased production rate of wells completed in the oil-bearing strata while employing the drilling muds in this invention. The small amount of water lost by filtration carries a certain concentration of divalent metal ions into the permeable formation. This filtrate, which contains a considerably higher concentration of divalent metal ions than the connate water, replaces the connate water from the clays in the porous strata and a marked permeability increase is noted. As the permeability of the formation is raised a higher fluid (oil) flow rate may be obtained at the same formation pressure differentials. It is apparent, although not definitely established, that through the mechanism of ion exchange the sodium clays are converted to corresponding divalent metal clays resulting in considerable clay shrinkage and permeability increase. Since the mechanism according to the above explanation has not been positively established, it is preferred that the present invention be not limited thereby.

The initial rate of production from a well drilled while employing the drilling mud of this invention is raised markedly by the permeability increase caused by clay shrinkage and simultaneously is decreased somewhat due to the increased degree of water saturation. Numerous tests, however, have indicated that this decreased production rate due to water saturation is a transient condition only and that the capillary forces counteract this condition in a very short time. The volume effect resulting from the action of a fresh water filtrate on clays of this type may be of a very large and serious magnitude causing heaving and sloughing of the formation and resulting in a stuck drill stem and possibly an abandoned well. The use of drilling muds containing divalent metal ion salts in certain narrow concentration ranges has been found to result in the inhibition of such heaving and sloughing conditions, the completion of a well having an increased rate of productivity, and at the same time permit the running of an accurate electric log of the borehole.

Divalent metal ions are preferably introduced into the drilling mud in the form of inorganic water-soluble salts such as the chlorides, nitrates, sulfates, and the like, of the divalent metals which are above iron in the electromotive series of metals. The divalent metals suitable include strontium, barium, calcium, magnesium, beryllium, manganese, zinc, and the like, which may be employed to effect the desired results. Calcium in the form of its water-soluble salts is the preferred divalent metal, and magnesium and zinc are also desirable. Calcium may be introduced into the drilling fluid in the form of calcium chloride, although other calcium salts may be employed.

Since the addition of saline materials, such as the divalent metal ion salts previously described, effects a shrinkage, or flocculation of colloidal clays, the colloidal clay employed in preparing the drilling mud of this invention is also partially or completely flocculated depending upon the amount of soluble salt employed. The immediate physical effects of such salt additions to drilling muds are principally a marked viscosity and water loss rate increase as well as a tendency for the clay employed in preparing the drilling mud to settle on standing. It is therefore necessary to add another material to form a drilling fluid which is readily pumpable, has a low water loss rate, and from which the suspended clay will not settle. Starch is the preferred protective colloid for obtaining these required remedial effects, although other materials may be employed as hereinafter more fully described. A small amount of starch only is necessary to restore the viscosity and water loss rate characteristics of the drilling mud to values within the desired ranges and a drilling fluid of unusually desirable properties results from such treatment.

Calcium-starch drilling muds of this invention are limited to relatively narrow ranges of concentration of calcium and starch since it has been found that unusual filtration rate characteristics are obtained within narrow limits. The quantity of calcium chloride incorporated into the drilling fluid has a marked effect on the filtration rate, causing it to decrease from relatively high and definitely unsatisfactory values as the calcium chloride concentration is increased from 1 to 3 pounds per barrel. Minima in the filtration rate curves are noted in the range of from about 4 to 5 pounds of calcium chloride per barrel. The filtration rates subsequently increase to higher values which are unsatisfactory for good drilling fluids as calcium chloride contents of greater than about 17.0 pounds per barrel are employed. The calcium chloride concentration has been found to critically affect the filtration rate within a narrow range. From these water loss data the preferred narrow calcium chloride concentration range is selected, which range extends from about 2.0 to about 10.0 pounds per barrel, although ranges as wide as from about 1.0 to about 17.0 pounds per barrel may be employed. The calcium chloride content in a drilling mud having a density of about 70 pounds per cubic foot varies on a percentage basis from as low as about 0.25% to as high as about 5.0% by weight. With muds having densities differing from 70, the percentage figures of course will vary, decreasing from the limits given previously with muds having higher densities and increasing with muds having lower densities.

It has further been found that increased quantities of starch causes an increase in the viscosity of the drilling mud and decreases the filtration rate. Since it is desirable that the drilling muds be conveniently pumpable without the use of unduly high mud pump pressures and also have filtration rates within ranges hereinafter defined, the quantity of starch incorporated in the drilling mud is also limited. It is desirable that the viscosity of the drilling fluid be maintained at a value below about 65 seconds as determined by the standardized tests previously described. It is preferable that this viscosity be maintained between about 35 and 55 seconds in order that a satisfactory drilling mud be obtained. It has also been found that the change in viscosity is more dependent upon the starch concentration than the calcium chloride concentration on a weight basis. From these considerations it is preferred therefore that the starch concentration of the drilling muds of this invention be between about 3.5 and 15 pounds per barrel of drilling mud having a density of about 70 pounds per cubic foot. The gelatinized starch content of the drilling fluids of the invention ranges from about 0.75% to as high as about 5.0% by weight. Drilling muds having satisfactory viscosity values may be obtained by employing starch within the concentration range named and calcium chloride in the concentration range previously defined in connection with the previous description of the variation of filtration rate characteristics of the drilling mud.

In summarizing, it is desirable that the drilling fluids of this invention have water loss rates of less than a maximum of about 40 ml. per hour and preferably less than about 25 ml. per hour. Many of the drilling fluids prepared according to this invention have filtration rates of less than about 15 ml. per hour. They further possess viscosities of less than 65 seconds and preferably between about 35 and 55 seconds. Such drilling muds may be prepared by incorporating between about 4 pounds per barrel and about 12 pounds per barrel of gelatinized starch, and between about 2 pounds per barrel and 10 pounds per barrel of calcium chloride. Very desirable drilling muds may be obtained by introducing about 4 and 6 pounds per barrel of calcium chloride and about 6 to 8 pounds per barrel of gelatinized starch.

The drilling muds of the present invention, their mode of preparation, their action on producing formations, and their use in drilling actual oil wells may be more clearly understood by reference to the following examples:

*Example I*

Another experimental well was drilled in the Brea Field of the Puente Hills area of Southern California in which the calcium chloride-starch base drilling mud of this invention was employed. The well was completed to a depth of 5385 feet and the initial 2600 feet was drilled with a conventional water base clay mud prepared from the following ingredients:

| Ingredient | | Amount |
| --- | --- | --- |
| Bentonite | sacks | 22 |
| Dry Mud | do | 20 |
| Water | barrels | 80 | to form about 85 barrels of drilling mud. During the succeeding 16 hours the following additional ingredients were added:

| Ingredient | | Amount |
| --- | --- | --- |
| Bentonite | sacks | 14 |
| Dry Mud | tons | 5 |
| Water | barrels | 80 | to form about 170 barrels of a drilling mud having a density of about 75 pounds per cubic foot and a viscosity of 40 to 41 seconds. The conventional drilling mud was employed together with necessary additions of water and clay to drill the hole to a depth of about 2600 feet. At this point a change-over was made by replacing the conventional water base mud with the calcium chloride-starch mud of this invention. The new mud was employed when drilling from a depth of about 2600 feet to a depth of 5037 feet during which time calcium chloride, starch, and water were added to the mud periodically to maintain the viscosity and filter rate characteristics within the proper ranges. A viscosity of between about 45 and 55 seconds and a density of between about 77 and 82 pounds per cubic foot was maintained. The filter rate in general was between about 4 and a maximum of about 12 ml. per hour. As the filtration rate approached the upper limit given, additional quantities of salt and calcium chloride were added to reduce this rate. At a depth of about 5037 feet a new calcium chloride-starch base mud was mixed containing the following ingredients:

| Ingredient | | Amount |
| --- | --- | --- |
| Dry Mud | pounds | 3,000 |
| Calcium Chloride | do | 600 |
| Starch | do | 1,000 |
| Water | barrels | 90 |

This mud had a density of about 68 pounds per cubic foot, and a viscosity of between about 47 and 54 seconds, and a filter rate of 3 ml. per hour was obtained. The drilling mud contained about 6.3 pounds per barrel of calcium chloride and about 10.5 pounds per barrel of starch. This mud was employed in reaming the borehole from a depth of 3051 feet to a depth of 4949 feet. Additional quantities of the calcium chloride-starch mud was employed in coring the borehole from a depth of about 5037 to a depth of 5214 in order to obtain data pertaining to the nature of the oil producing formation.

It was found desirable to employ the calcium chloride-starch mud of this invention in reaming the borehole as above described, so that the filtrate entering the formation from the drilling mud through the borehole face carries divalent calcium ions which treat the porous oil-bearing sand to increase the permeability.

*Example II*

Another experimental oil well was drilled in the Brea Field of the Puente Hills area of Southern California employing the starch-calcium chloride mud of this invention. The well was drilled to a depth of 2910 feet employing a conventional water base mud containing bentonite, dry mud, pyrophosphate and water. At this depth the calcium chloride-starch base mud was substituted and was prepared from the following ingredients:

| Ingredient | | Amount |
| --- | --- | --- |
| Dry Mud | shovels | 1,100 |
| Calcium Chloride | pounds | 1,400 |
| Starch | do | 1,700 | with sufficient water to form 140 barrels of drilling mud. The density was found to be 68½ pounds per cubic foot with a viscosity of 50 of a water loss of 1 cc. in 15 minutes. The mud contained about 10 pounds per barrel of calcium chloride and about 12.1 pounds per barrel of starch. This drilling mud was employed in deepening the existing hole from a depth of 2,910 feet to a depth of about 3,572 feet. Calcium chloride, starch and water were added periodically during this final drilling operation to maintain the physical properties of the drilling fluid within the desirable ranges.

The improved drilling fluids of this invention may be prepared in one of several different manners. The preferred procedure in preparing these calcium chloride-starch base drilling fluids is to dissolve between 1.0 and 17.0 pounds of calcium chloride per barrel of finished mud in the required amount of water to form a calcium chloride brine to which subsequently is added the dry mud or dry colloidal clay. This mixture is thoroughly agitated and mixed to form a uniform dispersion of clay particles in the calcium chloride brine. When this condition is attained, between 3.5 and 15.0 pounds of gelatinized starch per barrel of finished mud is incorporated with thorough mixing to form the improved drilling fluid according to this invention. This procedure of mud preparation was employed in making the drilling fluid employed in drilling the experimental well described in Example I. The following example illustrates the preferred method for the preparation of the drilling fluids of this invention:

*Example III*

A 45-barrel batch of experimental calcium chloride-starch base mud was prepared by adding 315 pounds of dry calcium chloride to 42 barrels (42 gallons per barrel) of water. When substantially complete solution of the calcium chloride was obtained, 250 shovels of dry Rogers' Lake clay, about 2250 pounds, was incorporated by thorough mixing into the calcium chloride brine. When a substantially complete dispersion of clay was thus obtained 550 pounds of gelatinous starch was added to the mixture to form a drilling fluid containing about 12.5 pounds of starch per barrel and about 7.0 pounds of calcium chloride per barrel. The density of the mud was about 69 pounds per cubic foot, the Marsh viscosity about 40 seconds and the water loss rate about 2.5 ml. in 15 minutes as determined by test procedures hereinabove defined.

Another procedure applicable in the preparation of drilling fluids according to this invention comprises mixing hydrated mud with a calcium chloride brine solution to form a saline mud having the desired density. Upon thoroughly agitating this mixture to obtain a uniform mud dispersion, a desired amount of starch is added to the mixture and agitated to obtain a homogeneous mass.

Another procedure which may be followed comprises dissolving the desired quantity of calcium chloride in water and subsequently dispersing the desired quantity of dry mud in the calcium chloride brine to form a homogeneous mixture which is allowed to stand for a period of about 24 hours. The required amount of starch is then incorporated in the mud-calcium chloride-water mixture aided by thorough agitation.

The drilling muds of the present invention, prepared as previously described and illustrated, and which contain calcium chloride and starch together with water and colloidal clays have been found to have highly desirable effects on porous formations such as oil-bearing strata. As previously described, the resulting increased porosity and the accompanying increased productivity are believed to be due to the shrinking action of divalent ions such as calcium on the argillaceous materials of the porous formation when the divalent metal ions are present in the drilling fluid in the limited concentrations above described.

It is difficult to compare the productivity of various wells even in a given field since the production rate is dependent upon a large number of variables including the degree of the depletion of the field, the porosity of the oil-bearing strata, the thickness of the oil-bearing strata, the effective reservoir pressure in the formation, the degree of water saturation in the formation, the oil gas ratio, the oil gravity, and the like. A method of correlation of these and other factors has been developed by F. R. Wade and is described in Paper No. 801-23J presented at the spring meeting of the Pacific Coast District, Division of Production of the American Petroleum Institute, May 15 and 16, 1947. This paper, entitled "The Evaluation of Completion Practice from Productivity Index and Permeability Data," reports the analysis of productivity and permeability data calculated and measured from a considerable number of oil wells drilled in the California oil fields. The paper further contains a method for evaluating a "production effectiveness factor" which may be taken as an indication of the efficiency of the well drilling and completion. It may be further employed to indicate the degrees of the effectiveness of various types of drilling fluids employed in the completion of oil wells.

The methods of correlation according to the cited publication have been applied to the comparison of oil wells completed with conventional water base muds with oil wells completed with the calcium chloride-starch base drilling fluids of this invention, and the results of this comparison are given in the following example:

*Example IV*

Calculations of the production effectiveness factor have been made for six wells drilled in the Brea-Olinda Field of Southern California completed into Pliocene formations. The first two of these six, designated as wells 1 and 2, were drilled and completed using a fresh water drilling mud with a normal water loss. Wells Nos. 3, 4, 5, and 6 were drilled in the producing interval using a calcium chloride-starch drilling mud with a comparatively low water loss according to this invention. The results obtained from these calculations are given below:

| Well No. | Gro B/D | Cut | P. I. | Sand Thick | S. P. I. | Permeability, md. | | | Std. Dev. | Compl. Eff—'e' |
|---|---|---|---|---|---|---|---|---|---|---|
| | | | | | | Arith. | Geom. | No. | | |
| | | Per cent | | Feet | | | | | | |
| 1 | 285 | 3.3 | 0.69 | 215 | 0.00312 | 1,129 | 410 | 48 | 4.46 | 0.149 |
| 2 | 292 | 73.6 | 0.75 | 406 | 0.00049 | 971 | 695 | 18 | 3.54 | 0.069 |
| 3 | 231 | 3.9 | 0.62 | 217 | 0.00273 | 1,145 | 808 | 18 | 3.32 | 0.205 |
| 4 | 128 | 43.8 | 0.24 | 217 | 0.00062 | 543 | 448 | 10 | 2.73 | 0.267 |
| 5 | 124 | 18.4 | 0.27 | 237 | 0.00093 | 591 | 462 | 5 | 1.85 | 0.198 |
| 6 | 321 | 70.8 | 0.50 | 171 | 0.00085 | 520 | 384 | 15 | 2.61 | 0.217 |

It will be noted that although the gross barrels per day production of oil from the two wells drilled with the conventional water base drilling muds are in excess of the gross barrels per day production rate of three of the four wells completed with the improved drilling muds of this invention, the completion effectiveness or production effectiveness factor for wells 1 and 2 drilled using fresh water base drilling fluid is considerably less than the completion effectiveness factor obtained for each of wells 3, 4, 5 and 6 completed with improved starch-calcium chloride drilling fluids of this invention. Although completion effectiveness factors for six wells in a given field may not be taken as a completely accurate indication of the effectiveness of the drilling fluids of the present invention, they may be taken as a moderately accurate indication of the improvement obtained by employing the improved drilling muds of the present invention in drilling through the producing horizon and completing an oil well to its greatest depth. The average of the completion effectiveness factors for wells 3, 4, 5 and 6 is 0.222 compared with an average of 0.109 for wells 1 and 2 which represent a percentage increase of the completion effectiveness factor in excess of 100%. It is believed that these data show conclusively the improvement obtainable in actual drilling and completion practice by employing the improved drilling fluids containing narrow ranges of calcium chloride and starch of this invention.

Other divalent metals besides calcium may be employed in the drilling muds of this invention by the addition of such divalent metals in the form of suitable water-soluble salts. In view of the fact that steel is employed as casing and drill tubing in contact with the drilling mud in the drilling of oil wells, only those divalent metals which lie above iron in the electromotive series of metals must be employed. These divalent metals include strontium, barium, calcium, magnesium, beryllium, manganese and zinc, calcium being the preferred divalent metal.

The function of starch in the drilling mud of the present invention as a protective colloid has been described hereinabove, and other protective colloids may be employed in place of starch. Other colloidal materials which may be employed include gelatin, agar agar, soya bean glue, casein and casein derivatives, various albumens, tannin and alginates such as those prepared from seaweeds and including Irish moss. Other colloidal materials which may be employed include the natural gums including gum tragacanth, gum karaya, and gum acacia or arabic. It is also possible to employ reaction products of these gums with an alkali metal hydroxide as the protective colloid in the place of starch. Alkali metal hydroxide reaction products of water-insoluble gums may further be employed such as the reaction products formed from gum copal, gum sandarac and gum ghatti. Water-soluble cellulose derivatives have been found to exert a beneficial effect on the mud similar to that of gelatinized starch. Such derivatives include methyl and ethyl celluloses and alkali metal carboxy methyl celluloses. Gelatinized starch, however, is the preferred protective colloid and includes gelatinous starches prepared from corn, wheat, and other cereal grains, or any other vegetable sources.

The drilling muds of the present invention may have densities in the range of from 62.3 pounds per cubic foot to as high as about 80 pounds per cubic foot. When drilling through formations in which gases or liquids exist under elevated pressures it is sometimes required that a drilling fluid having a density in excess of about 80 pounds per cubic foot be employed to apply a sufficiently high hydrostatic pressure to the high pressure formation to effectively prevent a blowout of gas or liquid from the formation. Under such conditions it is necessary to incorporate suitable weighting agents in the mud to increase the effective density. Such weighting agents in general include insoluble inorganic compounds of the heavy metals such as barium sulfate, barium carbonate, ferric oxide or red pigment, plumbic oxide or litharge, galena, silica, pulverized oyster shells or other inorganic compounds having a high specific gravity. By incorporating such weighting agents as finely divided solids in the improved drilling fluids of this invention, densities as high as about 120 pounds per cubic foot may be obtained.

In drilling fluids which contain materials which are subject to such bacterial action as fermentation, it is sometimes necessary to incorporate various germicides to prevent deterioration of these materials. It is possible to use small amounts of such compounds as cuprous sulfate, mercuric chloride, and the like, to inhibit bacterial action on organic constituents present in the drilling mud. Other materials which may be employed to effect a similar result include mono- and dihydric phenols, formaldehyde, and polymers of formaldehyde, and the like.

Having described and illustrated this invention which comprises an improved drilling fluid and method of drilling wells, and realizing that modifications may occur to those skilled in the art without departing from the spirit and scope of the following claims, I claim:

1. A drilling fluid for the drilling of oil, gas and water wells which comprises water and a colloidal clay together with about 10 pounds per barrel of a gelatinized starch between about 4 and 6 pounds per barrel of a water-soluble calcium salt.

2. A drilling fluid for the drilling of oil, gas and water wells which comprises water and a colloidal clay together with about 10 pounds per barrel of a water-soluble calcium salt and between about 4 and 6 pounds per barrel of gelatinized starch.

3. A drilling fluid for the drilling of oil, gas and water wells which comprises a mud to which has been added between about 4 and 6 pounds per barrel of calcium chloride and about 10 pounds per barrel of gelatinized starch.

JOHN E. SHERBORNE.

REFERENCES CITED

The following references are of record in the file of this patent:

UNITED STATES PATENTS

| Number | Name | Date |
| --- | --- | --- |
| 2,044,758 | Cross et al. | June 16, 1936 |
| 2,371,955 | Dawson et al. | Mar. 20, 1945 |
| 2,417,307 | Larsen | Mar. 11, 1947 |